(12) United States Patent
Gronenborn et al.

(10) Patent No.: US 9,096,042 B2
(45) Date of Patent: Aug. 4, 2015

(54) LIGHTING APPARATUS

(71) Applicant: KONINKLIJKE PHILIPS N.V., Eindhoven (NL)

(72) Inventors: Stephan Gronenborn, Eindhoven (NL); Holger Moench, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/394,754

(22) PCT Filed: Apr. 12, 2013

(86) PCT No.: PCT/IB2013/052905
§ 371 (c)(1),
(2) Date: Oct. 16, 2014

(87) PCT Pub. No.: WO2013/156909
PCT Pub. Date: Oct. 24, 2013

(65) Prior Publication Data
US 2015/0108371 A1    Apr. 23, 2015

Related U.S. Application Data

(60) Provisional application No. 61/625,136, filed on Apr. 17, 2012.

(51) Int. Cl.
*G02B 27/10* (2006.01)
*G02B 27/12* (2006.01)
*B23K 26/00* (2014.01)
*B23K 26/08* (2014.01)
(Continued)

(52) U.S. Cl.
CPC ..... *B32B 38/0008* (2013.01); *B32B 2038/0076* (2013.01); *B32B 2310/0806* (2013.01)

(58) Field of Classification Search
USPC ............ 250/491.1, 492.1, 494.1, 495.1, 526; 219/121.6, 121.61, 121.76, 121.78; 315/312, 318, 319, 363; 445/11, 14, 445/15, 25; 359/618, 619
See application file for complete search history.

(56) References Cited

U.S. PATENT DOCUMENTS 5,961,859 A * 10/1999 Chou et al. ............... 219/121.63
6,710,332 B2 * 3/2004 Joukawa et al. .......... 250/237 G
(Continued)

FOREIGN PATENT DOCUMENTS

| EP | 2002335046 | 11/2002 |
|---|---|---|
| EP | 2353768 A2 | 10/2011 |
| WO | 2011021140 A2 | 2/2011 |

*Primary Examiner* — Bernard E Souw

(57) ABSTRACT

The invention relates to a lighting apparatus (10) for providing processing light for processing an object. Groups of light sources generate light for processing the object, wherein the groups of light sources are imaged onto a working plane (17) by an imaging unit (16) for producing the processing light. The resulting intensity distribution is configured such that, if the intensity distribution is integrated in a spatial integration direction, the resulting integrated intensity distribution has an intensity dip, wherein one or several of the groups of light sources are controllable independently from the other of the groups of light sources for modifying the integrated intensity distribution. This allows using the lighting apparatus in a processing apparatus such that perpendicular to a processing line, along which an object is to be processed, in particular, to be sealed, the object can be processed relatively homogenously, thereby improving the quality of processing the object.

11 Claims, 19 Drawing Sheets

(51) Int. Cl.
  *B23K 26/067* (2006.01)
  *H05B 37/02* (2006.01)
  *H01J 9/24* (2006.01)
  *H01J 9/26* (2006.01)
  *B32B 38/00* (2006.01)

(56) References Cited

U.S. PATENT DOCUMENTS

| | | | |
|---|---|---|---|
| 7,620,233 B2 * | 11/2009 | Beck et al. | 382/152 |
| 7,872,418 B2 * | 1/2011 | Hata et al. | 313/512 |
| 2004/0005744 A1 | 1/2004 | Taniguchi et al. | |
| 2004/0036969 A1 | 2/2004 | Taniguchi et al. | |
| 2004/0161676 A1 | 8/2004 | Taniguchi et al. | |
| 2008/0210886 A1 * | 9/2008 | Nakamae et al. | 250/492.1 |
| 2009/0233513 A1 | 9/2009 | Lee et al. | |
| 2010/0208190 A1 * | 8/2010 | Yoshida | 349/160 |
| 2011/0036817 A1 | 2/2011 | Ehrmann et al. | |
| 2011/0148328 A1 | 6/2011 | Joseph et al. | |
| 2011/0165816 A1 | 7/2011 | Lee et al. | |
| 2012/0016615 A1 * | 1/2012 | Carpaij et al. | 702/96 |
| 2012/0281293 A1 * | 11/2012 | Gronenborn et al. | 359/619 |

* cited by examiner

LIGHTING APPARATUS

CROSS-REFERENCE TO PRIOR APPLICATIONS

This application is the U.S. National Phase application under 35 U.S.C. §371 of International Application No. PCT/IB2013/052905, filed on Apr. 12, 2013, which claims the benefit of U.S. Patent Application No. 61/625,136, filed on Apr. 17, 2012. These applications are hereby incorporated by reference herein.

FIELD OF THE INVENTION

The invention relates to a lighting apparatus for providing processing light for processing an object and to a manufacturing method for manufacturing the lighting apparatus. The invention relates further to a processing apparatus, a processing method and a processing computer program using the lighting apparatus.

BACKGROUND OF THE INVENTION

US 2011/0165816 A1 discloses a laser beam irradiation apparatus which irradiates a laser beam onto a sealing element disposed between a first substrate and a second substrate so as to seal the first substrate and the second substrate. The laser beam has a beam intensity which increases from a center portion to an end portion of the laser beam on a surface which is perpendicular to a proceeding direction of the laser beam. The beam intensity at the center portion of the laser beam is not larger than half of the beam intensity at the end portion of the laser beam, wherein the beam profile is symmetric relative to the proceeding direction of the laser beam.

If the sealing element is curved, the laser beam has to be moved along this curved line, wherein in this case in the curve an inner part of the sealing element will receive a larger laser beam intensity than an outer part of the sealing element. This can lead to an inhomogeneous sealing, which can result in sealing errors.

SUMMARY OF THE INVENTION

It is an object of the present invention to provide a lighting apparatus for providing processing light for processing an object, which allows improving the quality of processing the object. It is a further object of the present invention to provide a manufacturing method for manufacturing the lighting apparatus and to provide a processing apparatus, a processing method and a processing computer program using the lighting apparatus.

In a first aspect of the present invention a lighting apparatus for providing light for processing an object is presented, wherein the lighting apparatus comprises:
  groups of light sources for generating light for processing the object,
  an imaging unit for imaging the groups of light sources onto a working plane in which the object is to be sealed, thereby generating the processing light,
  wherein the groups of light sources and the imaging unit are adapted such that in the working plane the processing light is producible with an intensity distribution which is configured such that, if the intensity distribution is integrated in a spatial integration direction, the resulting integrated intensity distribution has an intensity dip, wherein one or several of the groups of light sources are controllable independently from the other of the groups of light sources for modifying the integrated intensity distribution.

Since the integrated intensity distribution has an intensity dip, i.e. since at a position the integrated intensity is smaller than at adjacent positions, the integrated intensity at positions being arranged more towards the respective ends of the integrated intensity distribution is larger than at the position of the intensity dip. In other words, a part of the working plane, which is covered by a more central part of the intensity distribution, may receive less light intensity than parts of the working plane, which are covered by the respective ends of the intensity distribution, if the intensity distribution and the working plane, in particular, an object located in the working plane, are moved with respect to each other along the spatial integration direction. This is particularly advantageous, if the processing light is sealing light, which is moved along a sealing line, along which the object should be sealed, wherein the previously mentioned spatial integration direction is parallel to the sealing line. In this case the central part of the sealing line will receive less light intensity than the outer parts of the sealing line, wherein, since generally in a sealing element, which may be used for sealing the object and arranged along the sealing line, heat removal is lowest in the central part of the sealing element, this can lead to a relatively homogeneous sealing of the object along the sealing line.

Generally, the degree of homogeneity may be reduced along curved parts of the sealing line, because an outer part of the curve may receive less intensity then an inner part. However, since at least one of the groups of light sources is individually controllable for modifying the integrated intensity distribution, the integrated intensity distribution may be adapted such that the sealing element is relatively homogeneously illuminated, even if the sealing element is not arranged along a straight sealing line, but along a curved sealing line. This allows the lighting apparatus to improve the quality of sealing the object and also to improve the quality of further applications for processing an object, which use processing light, like soldering or welding applications.

The intensity distributed generated by the groups of light sources and the imaging unit in the working plane is preferentially a two-dimensional intensity distribution is preferentially configured such that an integration of this two-dimensional intensity distribution along a direction being defined by the processing line, in particular, the sealing line, yields a one-dimensional integrated intensity distribution arranged along a line being perpendicular to the processing line.

It should be noted that the integration of the intensity distribution is, of course, not mathematically performed by the lighting apparatus, but only used for characterizing the intensity distribution generated by the groups of light sources and the imaging unit.

The light sources are preferentially vertical-cavity surface-emitting lasers (VCSELs).

The imaging unit comprises one or several optical elements like one or several lenses, in particular, one or several microlenses and/or one or several cylinder lenses. The imaging unit can be adapted to image the groups of light sources sharply or in a more blurry way.

The intensity dip is preferentially centrally located within the integrated intensity distribution such that, if the intensity distribution generated in the working plane and the object are moved relatively to each other in the spatial integration direction along the processing line, the central part of the processing line receives less light intensity than more outer parts of the processing line.

Preferentially, the groups of light sources and the imaging unit are adapted such that the integrated intensity distribution has a first maximum caused by light provided by a group of the groups of light sources and a second maximum caused by light provided by another group of the groups of light sources, wherein the intensity dip is located between the first maximum and the second maximum. A maximum can be caused by light provided by a single group or by light provided by several groups of light sources. The integrated intensity distribution with the first maximum, the second maximum and the intermediate intensity dip is preferentially M-shaped, especially roughly M-shaped.

At least one of the group causing the first maximum and the other group causing the second maximum is preferentially individually controllable such that the integrated intensity at the position of at least one of the first maximum and the second maximum, respectively, is reducible. The preferred M-shape of the integrated intensity distribution can therefore be modified such that at least one peak of the M-shape is lowered, in particular, such that at least one peak vanishes. The original peak may be reduced to an integrated intensity being smaller than the originally intermediate intensity dip. Thus, if the processing light is moved in the working plane along a curved processing line, the inner part of the processing line can receive less light intensity, while the outer part of the processing line can receive more light intensity at a same point in time, wherein, since the inner part of the processing line is shorter than the outer part of the processing line in the curve, the total received light intensity perpendicular to the processing line, which is received during the complete movement along the curved part of the processing line, can be more homogeneous.

In an embodiment at least one of the groups of light sources is individually controllable such that the depth of the intensity dip in the integrated intensity distribution is modifiable. This allows the lighting apparatus to adapt the depth of the intensity dip to the respective processing process such that the processing can be performed with a desired integrated intensity distribution. This can further improve the quality of processing the object.

The groups of light sources and the imaging unit may be adapted such that the intensity distribution producible by the lighting apparatus comprises several parallel light lines, wherein within at least one of the light lines the intensity distribution has a first maximum and a second maximum with an intermediate lower intensity. For instance, all light lines can have an intensity distribution with a first maximum, a second maximum and an intermediate lower intensity. Or, one or several of the light lines may have another intensity distribution, for instance, a homogeneous intensity distribution. In an embodiment, one light line has an intensity distribution with a first maximum, a second maximum and an intermediate lower intensity, and the other light lines have homogeneous intensity distributions.

The lighting apparatus is preferably arranged such that the several parallel light lines are perpendicular to a sealing line, along which a sealing element may be arranged. Moreover, there is preferentially a distance between the parallel light lines. The parallel light lines are preferentially individually controllable such that also along the sealing line the intensity distribution can be modified. Moreover, also the first maximum and the second maximum within the respective light line can be individually controllable by controlling respective groups of light sources forming the first maximum and the second maximum, respectively, in order to allow the lighting apparatus to modify the intensity distribution perpendicular to the sealing line, in particular, if the sealing line has straight parts and curved parts.

The intensity, in particular, the intensity distribution, of the light lines can be individually modifiable, in order to account for a possible presence of small features either in the processing line or in the surrounding of the processing line, which may modify the amount of absorbed light by, for example, absorbance and/or reflectivity changes in the processing line or in the surrounding of the processing line. For instance, metal lanes for electrical connections may cross the processing line below the processing line and may reflect a part of the light transmitted through the processing line back into the processing line such that the intensity absorbed by the part of the processing line, which is crossed by the metal lane, may receive a larger intensity than other parts of the processing line where metal lanes are not crossing. In order to account for this adverse effect, the intensity of the light line being in the area of the metal lane can be reduced such that the absorbed intensity in the processing line can be kept approximately constant, even if metal lanes cross the processing line below the processing line. The light lines have therefore preferentially a dimension in the direction of the processing line, i.e. in the movement direction, being in the order of the dimensions of the features, for instance, of the metal lanes, which are likely to increase the absorption in the processing line, in the same direction.

A group of light sources is preferentially a two-dimensional array of light sources. However, in an embodiment a group can also comprise only a single light source.

The groups of light sources can all be individually controllable or several groups can be combined such that the resulting combination is controllable independently from the other groups of light sources. The lighting apparatus can comprise several of these combinations, wherein each of these combinations of groups of light sources can be individually controllable.

Preferentially the light sources of at least two groups have different shapes. For instance, the light sources of at least one group may have a triangular, a rectangular or a roughly conical shape. This allows tailoring the intensity distribution as desired by using certain shapes of the light sources.

In an embodiment, the lighting apparatus comprises two groups, each group comprising a linear arrangement of light sources, wherein the linear arrangements of the two groups are parallel to each other. This two rows solution allows electrically connecting the light sources towards the outside, for instance, via wire bonding.

The imaging unit may comprise microlenses assigned to the light sources such that for imaging a respective light source a respective microlens is used, wherein for at least one light source the microlens is asymmetrically arranged with respect to the light source such that a center of the microlens does not coincide with a center of the light source. By arranging the respective microlens asymmetrically with respect to the respective light source, the image of the respective light source, which contributes to the final intensity distribution in the working plane, can be moved as desired within the working plane for producing a desired intensity distribution. For instance, for generating a first maximum of the integrated intensity distribution being arranged in front of the intensity dip with respect to a spatial direction, the centers of the microlenses can be arranged at the back ends of the respective light sources forming this first maximum with respect to the spatial direction. Correspondingly, for forming the second maximum of the integrated intensity distribution behind the intensity dip of the integrated intensity distribution with respect to the spatial direction the centers of the respective microlenses can be arranged at the frontal ends of the respective light sources forming the second maximum of the integrated intensity distribution with respect to the spatial direction.

The imaging unit may be adapted to image the groups of light sources onto the working plane such that images of the different groups of the light sources overlap in the working plane. This can lead to a further homogenized intensity distribution.

The imaging of the groups of light sources onto the working plane can be performed such that the images, which overlap, are sharply imaged onto the working plane. Alternatively, the imaging can be performed such that the images of the different groups of light sources are more blurry, i.e. the imaging may be out of focus. For example, the imaging unit can be adapted to image a first plane, which is located in front of or behind a second plane, in which the light sources are located, and in which the light of the different groups of light sources overlap, sharply onto the working plane.

The lighting apparatus may further comprise at least one heat radiation detection unit arranged adjacent to a group of light sources for measuring the temperature in the working plane such that the group of light sources is controllable by a control unit depending on the measured temperature. In particular, if the lighting apparatus is used for sealing an object along a sealing line, wherein the lighting apparatus and the object are moved with respect to each other such that the sealing light is moved along the sealing line, in an embodiment the lighting apparatus comprises several heat radiation detection units, which are arranged along a line being perpendicular to the movement direction of the sealing light, for measuring the temperature profile perpendicular to the sealing line. Moreover, the groups of light sources are preferentially adapted such that the integrated intensity distribution can be modified along a spatial direction being perpendicular to the sealing line. This allows modifying the integrated intensity distribution in the spatial direction, which is perpendicular to the sealing line, depending on the temperature profile measured along the same spatial direction for generating a desired temperature profile within a sealing element that may be arranged along the sealing line. This control of the sealing process depending on the temperature profile can further improve the quality of sealing the object.

It is further preferred that one or several of the groups of light sources are controllable independently from the other of the groups such that the intensity distribution is modifiable in two different spatial directions. In particular, the groups of light sources may be individually controllable, in order to modify the intensity distribution in two different spatial directions. The two different spatial directions are preferentially perpendicular to each other. In particular, the intensity distribution may be modifiable in a first spatial direction being perpendicular to a sealing line, along which a sealing procedure is performed, and in a second spatial direction, which is perpendicular to the first spatial direction, i.e. a second spatial direction along the sealing line. This allows adapting the intensity distribution along the first spatial direction, in order to consider, for example, needed differences in the intensity distribution in straight parts of the sealing line and in curved parts of the sealing line, and in the second spatial direction, in order to consider that, even if the sealing line does not change its shape, i.e. even if the sealing line remains straight or has a constant curvature, different intensities may be desired, because the surrounding of the respective part of the sealing line has, for instance, different absorbing and/or reflecting properties, which may lead to different temperatures along the sealing line, if the light intensity is not changed. Thus, an individual control of groups of light sources in the first and second spatial directions can lead to a further improved quality of sealing the object.

Moreover, at least some of the groups of light sources may be individually controllable such that along a spatial direction, which is preferentially perpendicular to the processing line, an integrated intensity profile can be generated, which has two outer intensity maxima with an intermediate intensity dip, wherein the spatial orientation of this spatial direction, along which the integrated intensity distribution has this roughly M-shape, can be modified. In this example, the integrated intensity is the intensity distribution in the working plane integrated in the direction, in which the processing line is arranged. For instance, the groups of light sources may be individually controllable such that the spatial orientation of this spatial direction may be modified by 45 degrees steps or by smaller angular steps. This may allow a processing apparatus comprising the lighting apparatus to steer the processing light along the processing line such that the spatial direction, in which the integrated intensity distribution is roughly M-shaped, is always substantially perpendicular to the processing line, without rotating the lighting apparatus, even if the processing line is curved. This allows for an improved quality of processing the object, without necessarily requiring mechanical means for rotating the lighting apparatus.

The groups of light sources may be arranged on one or several substrates such that the one or several substrates comprise light emitting areas and non-light emitting areas, wherein the non-light emitting areas are adapted to absorb and/or scatter light meeting the non-light emitting areas such that light back reflected from the working plane is not reflected back to the working plane. For instance, the non-light emitting areas may be absorbing, tilted with respect to the light emittings areas or adapted to scatter the light in arbitrary directions. This reduces the likelihood of "ghost images" of the light sources in the working plane caused by reflected light, thereby further improving the quality of processing the object.

In a further aspect of the present invention a processing apparatus for processing an object along a processing line is presented, wherein the processing apparatus comprises:
  the lighting apparatus for providing processing light as defined in claim 1,
  a moving unit for moving the lighting apparatus and the object with respect to each other such that the processing light is moved along the processing line.

In another aspect of the present invention a manufacturing method for manufacturing a lighting apparatus for providing processing light for processing an object is presented, wherein the manufacturing method comprises:
  providing groups of light sources for generating light for processing the object,
  providing an imaging unit for imaging the groups of light sources onto a working plane, in which the object is to be sealed, for generating the processing light,
  assembling the groups of light sources and the imaging unit for producing the lighting apparatus,
  wherein the groups of light sources and the imaging unit are configured and assembled such that in the working plane the processing light is producible with an intensity distribution which is configured such that, if the intensity distribution is integrated in a spatial integration direction, the resulting integrated intensity distribution has an intensity dip, wherein one or several of the groups of light sources are controllable independently from the other of the groups for modifying the intensity distribution.

In a further aspect of the present invention a processing method for processing an object along a processing line is presented, wherein the processing method comprises:

providing processing light by the lighting apparatus as defined in claim 1, moving the light apparatus and the object with respect to each other such that the processing light is moved along the processing line by a moving unit.

In another aspect of the present invention a processing computer program for processing an object in a working plane is presented, wherein the processing computer program comprises program code means for causing a processing apparatus as defined in claim 1 to carry out the steps of the processing method as defined in claim 14, when the processing computer program is run on a computer controlling the processing apparatus.

It shall be understood that the lighting apparatus of claim 1, the processing apparatus of claim 12, and the processing method of claim 14 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
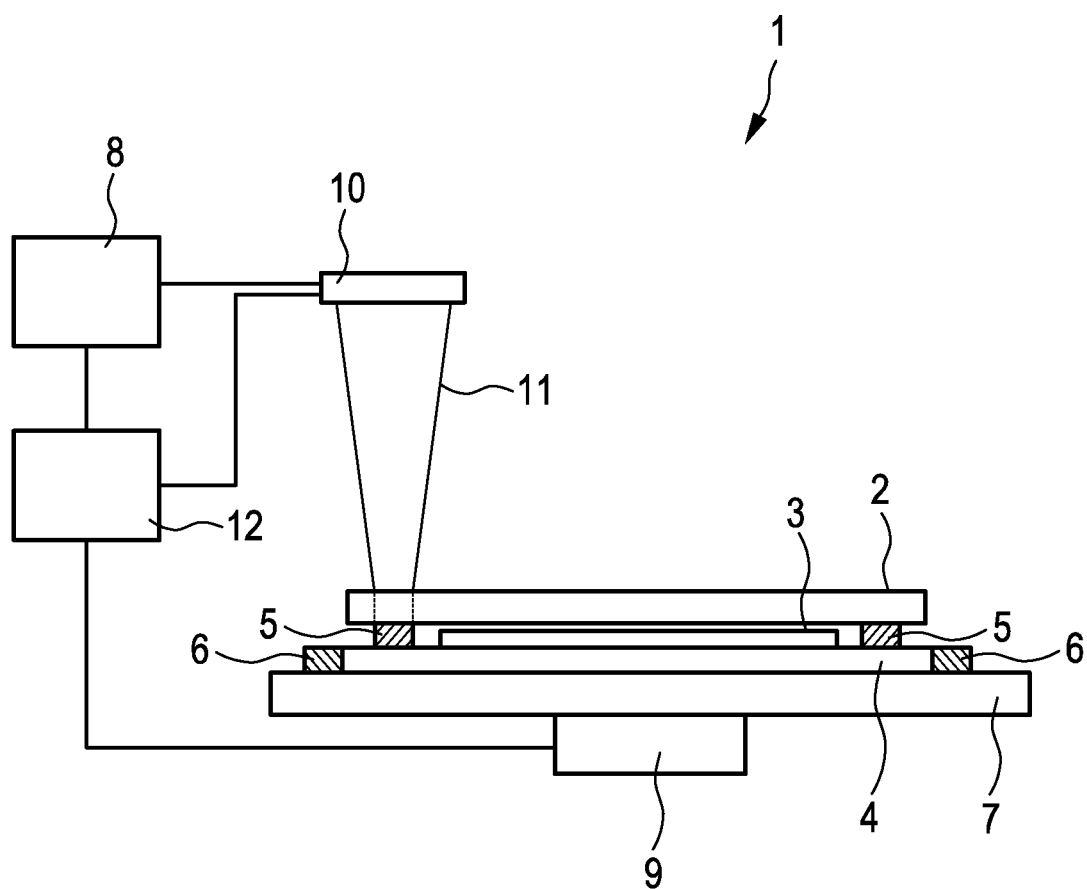
FIG. 1 shows schematically and exemplarily an embodiment of a processing apparatus for processing an object along a processing line, FIG. 2 schematically and exemplarily illustrates a possible position of processing light on the processing line.

FIG. 1 shows schematically and exemplarily an embodiment of a processing apparatus for processing an object along a processing line. In this embodiment, the processing apparatus 1 is a sealing apparatus for sealing an object along a sealing line. The sealing apparatus 1 comprises a lighting apparatus 10 for providing sealing light 11 and a moving unit 9 for moving the lighting apparatus 10 and the object 3 and, thus, a sealing element 5 with respect to each other such that the sealing light 11 is moved along the sealing line, along which the sealing element 5 is arranged. In this embodiment, the object to be sealed is an organic light emitting unit 3 including at least one organic light emitting device in which at least one organic layer including an emission layer is interposed between a first electrode and a second electrode. The first electrode and the second electrode may function as an anode for injecting holes and a cathode for injecting electrodes, respectively. The organic light emitting unit 3 is well-known such that the technical details of the organic light emitting unit 3 are not shown in FIG. 1 for clarity reasons. In other embodiments, also another object can be sealed by the sealing apparatus 1.

The object 3 is located between a first substrate 2 and a second substrate 4, wherein the sealing element 5 surrounding the object 3 is located between the first and second substrates 2, 4. The first substrate 2 may be an encapsulation substrate which encapsulates the object 3 arranged on the second substrate 4. The first substrate 2 being preferentially an encapsulation is transparent to the sealing light 11, in order to allow the sealing light 11 to heat the sealing element 5 between the first and second substrates 2, 4.

The substrates 2, 4 can be glass substrates. The sealing element 5 is preferentially a glass frit, which is molten by the sealing light 11, in order to seal the encapsulating first substrate 2 to the second substrate 4. The second substrate 4 is held by holding elements 6, which may be clamping elements or other holding elements, in a fixed position with respect to a movable table 7. The table 7 is movable by the moving unit 9 such that the object 3, in particular, the sealing element 5, can be moved with respect to the lighting apparatus 10, in order to steer the sealing light 11 along the sealing line, along which the sealing element 5 is arranged.

Figure 2:
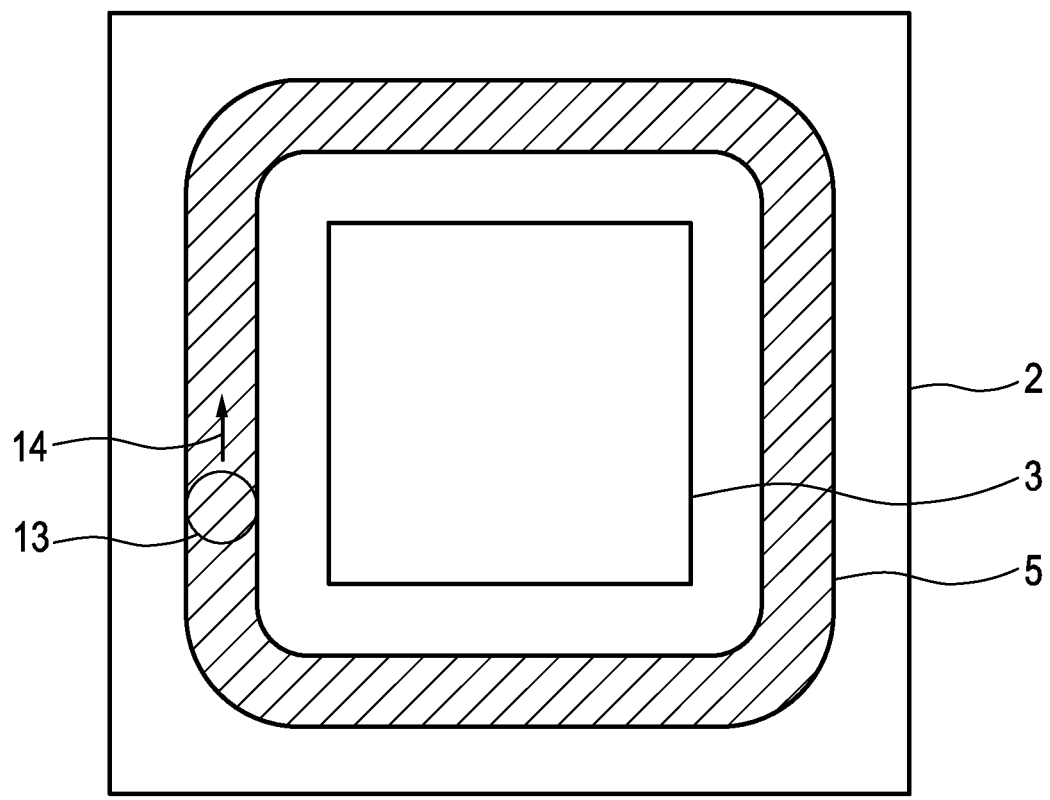

FIG. 2 shows schematically and exemplarily the arrangement of the object 3, the sealing element 5 and the first encapsulating substrate 2 in a top view, wherein reference number 13 indicates the sealing light on the sealing element 5 and the arrow 14 indicates the actual movement direction of the sealing light 13 with respect to the sealing element 5.

The sealing apparatus 1 further comprises a power source 8 for providing electrical power for allowing the lighting apparatus 10 to emit the sealing light 11 and a control unit 12 for controlling the power source 8, the lighting apparatus 10 and the motor 9. Since the motor 9 moves the object 3, in particular, the sealing element 5, with respect to the lighting apparatus 10, the motor 9 can be regarded as being a moving unit for moving the lighting apparatus 10 and the object 3 with respect to each other such that the sealing light 11 is moved along the sealing line. In other embodiments, a moving unit may only move the lighting apparatus with respect to the object for moving the sealing light along the sealing line, or the moving unit may move both, the lighting apparatus and the object, in particular, the sealing element, with respect to each other, in order to move the sealing light along the sealing line.

Figure 3:
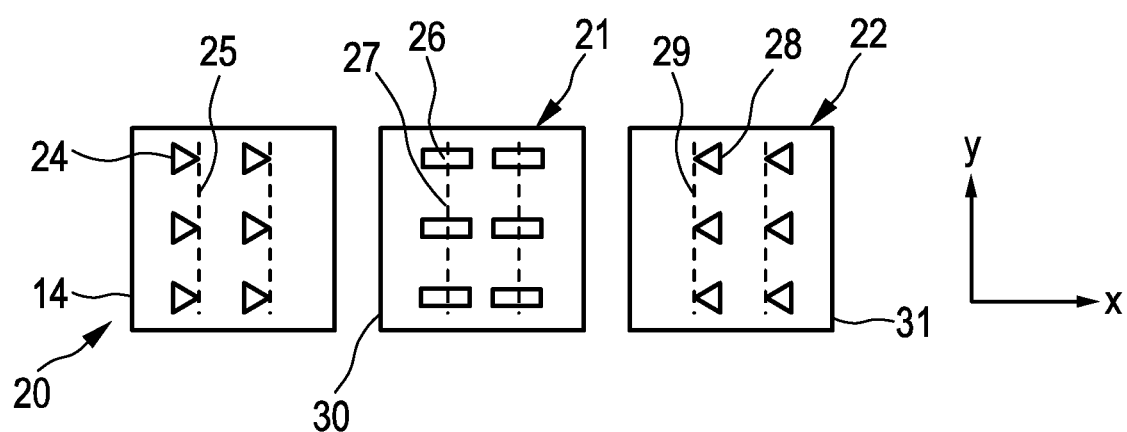
FIG. 3 shows schematically and exemplarily groups of light sources of a lighting apparatus of the processing apparatus.

The lighting apparatus 10 comprises several groups 20, 21, 22 of light sources for generating light for sealing the object 3, which are schematically and exemplarily shown in FIG. 3. FIG. 3 also shows a coordinate system with an x-axis and a y-axis, wherein the y-axis is parallel to the movement direction 14 shown in FIG. 2. A first group 20 comprises triangular light sources 24 arranged on a substrate 14. A second group 21 of rectangular light sources 26 is arranged on a substrate 30 and a third group 22 of triangular light sources 28 is arranged on a substrate 31. The three groups 20, 21, 22 of light sources are arranged along a line being parallel to the x-axis. In other embodiments, the three groups 20, 21, 22 of light sources could also be arranged at different y-positions. Also the order of the three groups in the x-direction can be modified. For instance, in the x-direction firstly the groups 20, 22 with the triangularly shaped light sources and then the group 21 with the rectangularly shaped light sources can be arranged. The kind of superposition of the images of the light sources in a working plane is substantially determined by an arrangement of microlenses with respect to the light sources as will be described further below. In this embodiment, each group 20, 21, 22 comprises two rows of light sources 24, 26, 28, which are parallel to each other, wherein each line of light sources 24, 26, 28 comprises three light sources.

Figure 4:
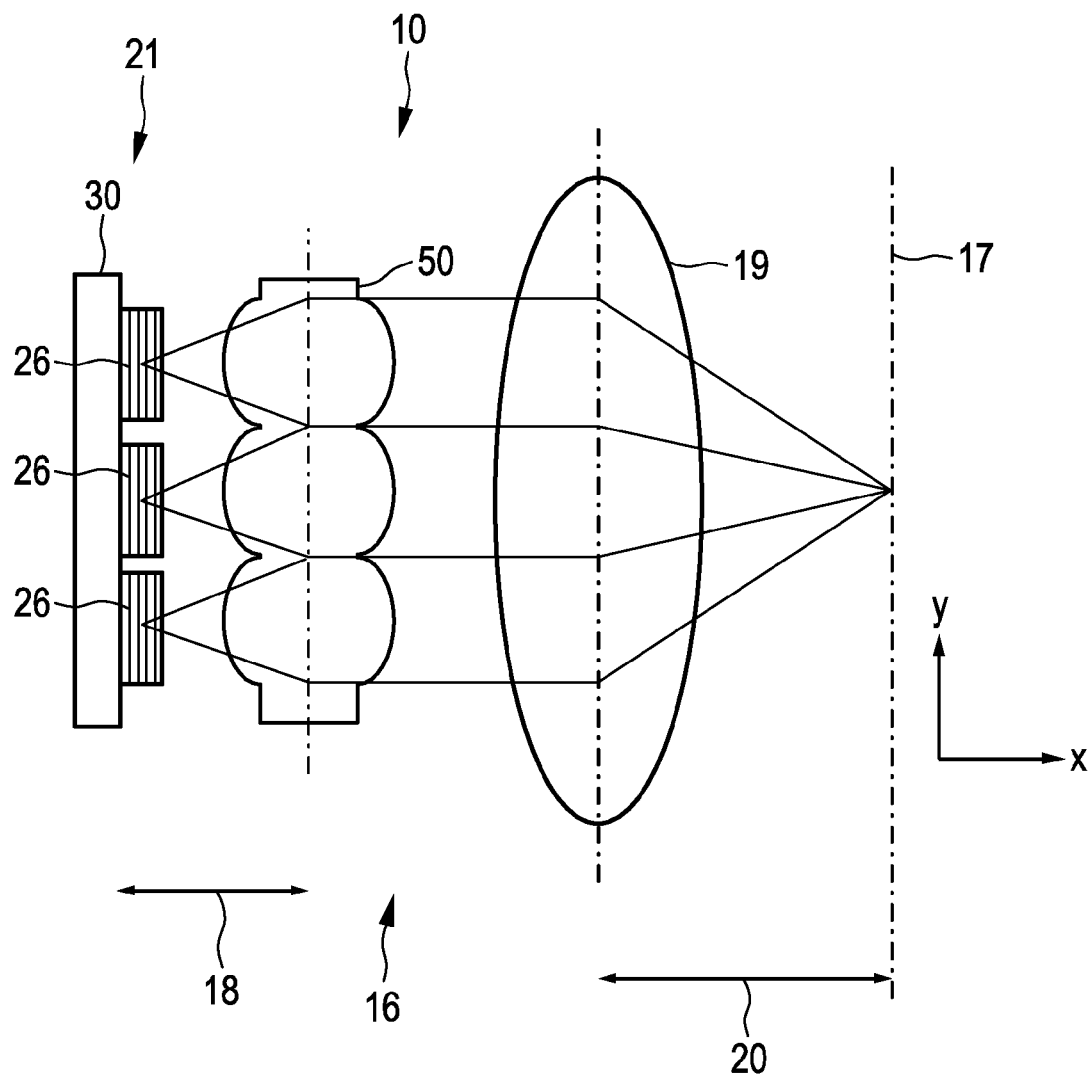
FIG. 4 shows schematically and exemplarily the lighting apparatus of the processing apparatus.

The lighting apparatus 10 further comprises an imaging unit 16 for imaging the groups 20, 21, 22 of light sources onto a working plane, in which the object 3 is to be sealed, for generating the sealing light 11, which is schematically and exemplarily shown in FIG. 4.

In FIG. 4 the imaging of the second group 21 of light sources 26 onto the working plane 17 is exemplarily shown. The imaging unit 16 comprises three arrays of microlenses, which correspond to the groups, i.e. arrays, of light sources of the respective groups 20, 21, 22, such that to each light source a respective microlens is assigned. FIG. 4 shows schematically and exemplarily the array 50 of microlenses for the second group 21 of light sources 26. The imaging unit 16 further comprises an optical element 19 for imaging the light from the microlenses onto the working plane 17. Preferentially, for imaging the light from the microlenses of the different groups of light sources the same optical element 19 is used, which is preferentially an optical lens.

In FIG. 3 the broken lines 25, 27, 29 indicate the spatial positions of the centers of the respective microlenses used for imaging the respective light sources 24, 26, 28. As can be seen in FIGS. 3 and 4, the centers of the microlenses for the second group 21 coincide with the centers of the light sources 26 of the second group 21, whereas the microlenses for the first group 20 of light sources 24 and for the third group 22 of light sources 28 are asymmetrically arranged with respect to the respective light sources such that the center of the respective microlens does not coincide with the center of the respective light source. In particular, regarding the light sources 24 of the first group 20 the centers of the respective microlenses coincide with the end of the respective light sources in the increasing x-direction, whereas the centers of the respective microlenses for imaging the light sources 28 of the third group 22 coincide with the ends of the respective light sources 28 in the decreasing direction of the x-axis.

The light sources are preferentially arranged in the focal plane of the microlenses such that the distance 18 between the light sources and the microlenses is preferentially equal to the focal distance of the microlenses. Moreover, the working plane 17 is preferentially in the focal plane of the optical element 19 such that the distance 20 between the working plane 17 and the optical element 19 is preferentially equal to the focal distance of the optical element 19.

The intensity distribution generated by the groups of light sources and the imaging unit in the working plane is a two-dimensional intensity distribution. Integrating this two-dimensional intensity distribution along a direction being defined by the sealing line yields a one-dimensional integrated intensity distribution, which is arranged along a line being perpendicular to the sealing line.

The groups 20, 21, 22 of light sources and the imaging unit 16 are adapted such that in the working plane 17 the sealing light 11 is producible with an integrated intensity distribution having an intensity dip along a spatial direction being, in this embodiment, the x-direction and that one or several of the groups 20, 21, 22 of light sources are controllable independently from the other of the groups for modifying the integrated intensity distribution. Preferentially, the integrated intensity distribution has a first maximum caused by light provided by the first group 20 and a second maximum provided by the light of the third group 22, wherein the intensity dip is located between the first maximum and the second maximum. The integrated intensity distribution along the x-direction is therefore preferentially substantially M-shaped.

At least one of the first group 20 and the third group 22 is individually controllable such that the integrated intensity at the position of at least one of the first maximum and the second maximum, respectively, is reducible. Also the second group 21 of light sources may be individually controllable, in order to modify the height of the intensity dip between the first maximum and the second maximum. The preferred M-shape of the integrated intensity distribution along the x-axis can therefore be modified such that at least one peak of the M-shape is lowered, in particular, such that at least one peak vanishes. This allows considering the movement of the sealing light 11 through curves of the sealing element 5, without heating the inner part of the sealing element 5 within the curve much stronger than the outer part of the sealing element 5 in the curve. Preferentially, the intensity distribution is controllable such that the sealing element 5 is homogeneously heated along a line being perpendicular to the sealing line, along which the sealing element 5 is arranged, also in a curved part of the sealing element 5.

Figure 5:
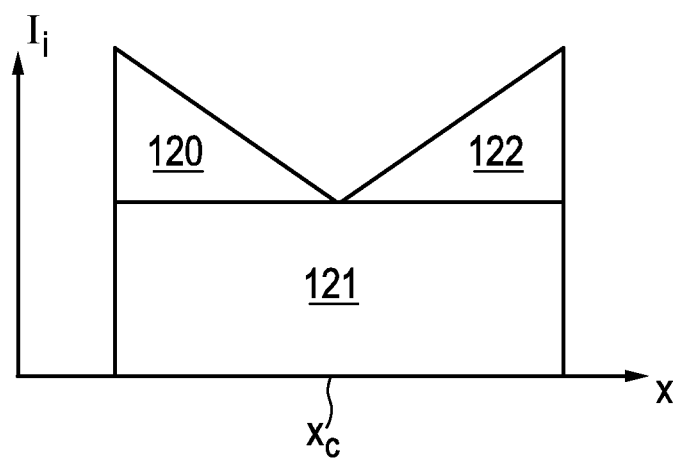
FIG. 5 shows schematically and exemplarily an integrated intensity distribution of the processing light.

FIG. 5 shows schematically and exemplarily the integrated intensity $I_i$ being the intensity within the working plane 17 integrated along the y-direction depending on the x-position. Thus, FIG. 5 schematically and exemplarily shows an integrated intensity distribution along a line being perpendicular to the sealing line. The integrated intensity distribution is formed of three parts 120, 121, 122. The first part 120 is caused by light of the first group 20 of light sources. The second part 121 is caused by light of the second group 21 of light sources and the third part 122 is caused by light of the third group 22 of light sources. The integrated intensity comprises a first maximum, a second maximum and an intermediate intensity dip. The integrated intensity profile is preferentially used, if the sealing light 11 is moved along a straight sealing line. If the sealing line is curved, the intensity of the first group 20 or of the second group 22 may be reduced, in particular, the respective group may be switched off, in order to reduce the intensity of the first part 120 or the second part 122, respectively, of the integrated intensity distribution. This allows modifying the integrated intensity distribution such that it fits to a curved sealing line. In FIG. 5 the coordinate $x_c$ indicates the x-position of the center of the sealing element 5.

Figure 6:
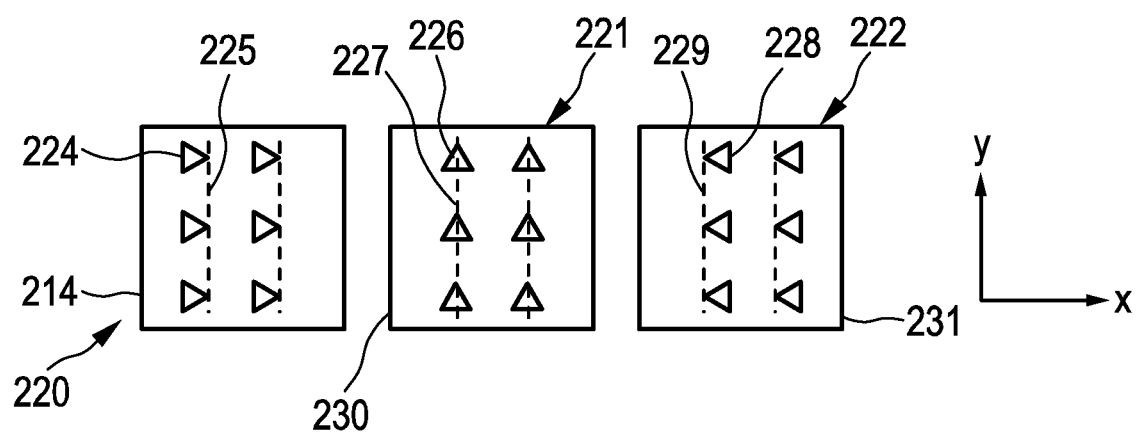
FIGS. 6 and 8 show schematically and exemplarily further embodiments of groups of light sources of the lighting apparatus.

FIG. 6 shows schematically and exemplarily another embodiment of groups 220, 221, 222 of light sources 224, 226, 228, which may be used by the lighting apparatus 10. As can be seen in FIG. 6, the light sources 224, 226, 228 of the three groups 220, 221, 222 have the same shape, but different orientations. Moreover, also in FIG. 6 the broken lines 225, 227, 229 indicate that the microlenses are centrally arranged with respect to the light sources 226 of the second group 221 and asymmetrically arranged with respect to the light sources 224, 228 of the first and third groups 220, 222, and also in this embodiment the light sources 224, 226, 228 are arranged on respective substrates 214, 230, 231. The resulting integrated intensity depending on the x-positions is schematically and exemplarily shown in FIG. 7.

Figure 7:
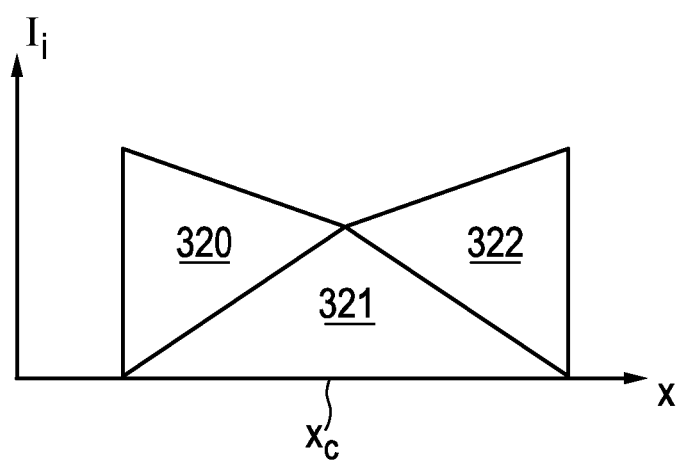
FIGS. 7 and 9 show schematically and exemplarily integrated intensity distributions of the processing light generated by the groups of light sources shown in FIGS. 6 and 7, respectively.

As can be seen in FIG. 7, also in this embodiment the integrated intensity comprises a first part 320 caused by light of the first group 220 of light sources, a second part 321 caused by light of the second group 221 of light sources and a third part 322 caused by light of the third group 222 of light sources. The integrated intensity shown in FIG. 7 is substantially M-shaped in a spatial direction being parallel to the x-axis, wherein one maximum of the integrated intensity distribution can be diminished, in particular, switched off, when the sealing light is steered along a curved part of the sealing line.

Figure 8:
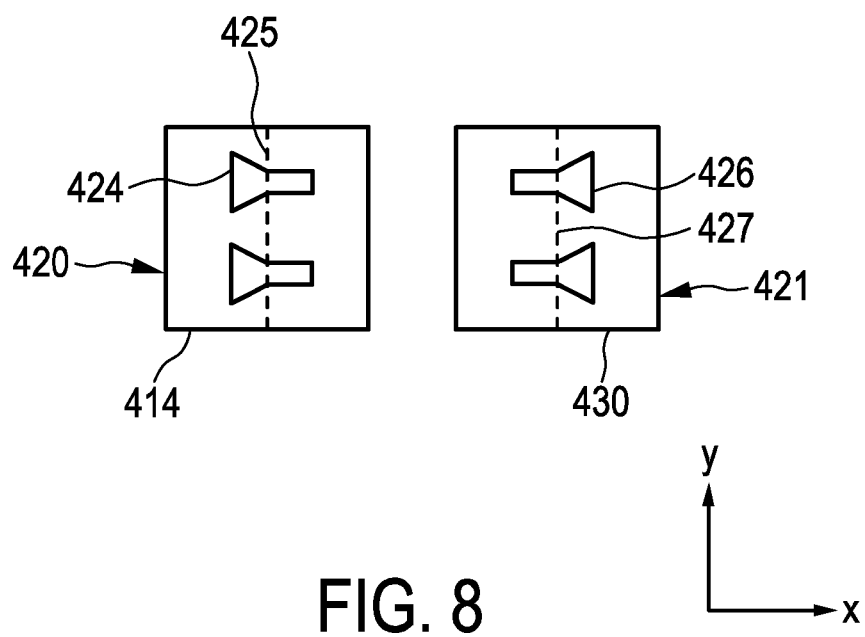

FIG. 8 shows schematically and exemplarily a further embodiment of different groups of light sources, which may be used by the lighting apparatus 10. Both groups 420, 421 comprise two substantially conically shaped light sources 424, 426 arranged in a line being parallel to the y-axis, wherein the light sources 424, 426 are arranged on respective substrates 414, 430 and wherein the light sources of different groups have the same shape, but they are rotated by 180° with respect to each other. In this embodiment the centers of the light sources 424, 426 coincide with the centers of the microlenses as indicated by the broken lines 425, 427.

Figure 9:
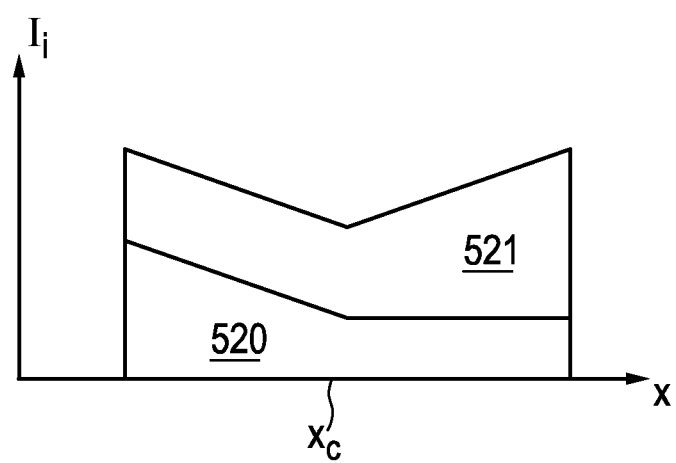

FIG. 9 shows schematically and exemplarily an integrated intensity distribution, which is the intensity integrated along the y-direction in the working plane, depending on the x-coordinate. Also in this embodiment the resulting integrated intensity distribution is substantially M-shaped, wherein by diminishing the intensity of one of the groups 420, 421 of light sources, in particular, by switching one of the groups 420, 421 off, the part 521, which is caused by the second group 421 of light sources, or the part 520, which is caused by the first group 420 of light sources, can be diminished, in particular, removed from the integrated intensity distribution. Thus, also in this embodiment the intensity distribution can be modified such that it fits to a curved part of the sealing line.

The lighting apparatus 10 is therefore preferentially adapted such that it provides an integrated intensity distribution within the working plane, which is roughly M-shaped in the x-direction that is perpendicular to the sealing line, wherein at the center of the sealing line less intensity is provided, because the heat removal is lowest in the center of the sealing element. Moreover, the lighting apparatus provides addressability, in order to reduce the intensity in at least one shoulder of the M-shaped integrated intensity distribution, when the sealing light is moved around a rounded corner along the seal track, i.e. along the sealing line.

The light sources are preferentially VCSELs, wherein different groups of VCSELs are preferentially individually addressable by corresponding current supplies and imaged to the target plane, i.e. the working plane. The VCSELs can have different shapes as schematically and exemplarily shown in FIGS. 3, 6 and 8, wherein the superposition of the light source images is shown in respective FIGS. 5, 7, 9. The different groups are preferentially provided with individual current supplies such that individual power settings are possible and such that the intensity profile can be adapted as required. For instance, a lower power can be provided for an inner shoulder of the M-shaped integrated intensity distribution in a curve.

FIGS. 6 and 7 show a configuration, which allows more extreme differences between the central dip and the shoulders, in particular, the maxima. Moreover, in the embodiment shown in these figures only one VCSEL shape is needed, i.e. simply the orientation of the chips of the individual groups is different. FIGS. 8 and 9 show an alternative with only two different groups, which both use the same VCSEL shape. In this embodiment, each group comprises a linear arrangement of light sources, wherein the linear arrangements of the two groups are parallel to each other. This configuration reduces the number of addressing lines and especially offers a two-row solution, where all electrical connections can be made via wire bonding towards the outside.

The lighting apparatus can further comprise heat radiation detection units arranged adjacent to the groups of light sources for measuring the temperature in the working plane such that the groups of light sources are controllable depending on the measured temperature by the control unit 12. Thus, the temperature measured by the heat radiation detection units can be provided to the control unit 12, in order to allow the control unit to control the power supplied to the different groups of light sources depending on the measured temperature. A preferred arrangement of heat radiation detection units will in the following be described with reference to a further embodiment 610 of a lighting apparatus, which can be used by the sealing apparatus 1 instead of the lighting apparatus 10 described above with reference to FIGS. 3 to 9.

Figure 10:
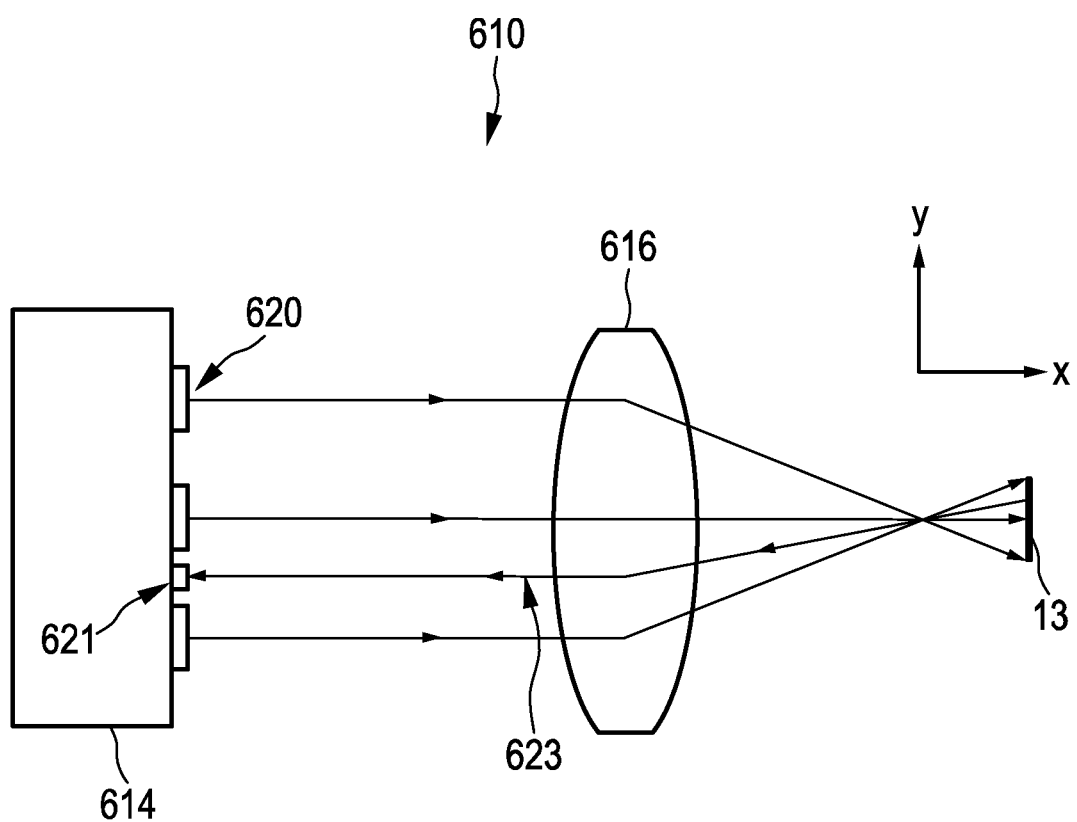
FIG. 10 shows schematically and exemplarily a further embodiment of the lighting apparatus of the processing apparatus.

The lighting apparatus 610, which is schematically and exemplarily shown in a side view in FIG. 10, comprises several groups 620 of VCSELs arranged on a substrate 614. Each group of VCSELs 620 is preferentially a two-dimensional array of VCSELs. In between the groups 620 of VCSELs heat radiation detection units 621 are arranged. The arrangement of the heat radiation detection units 621 on the substrate 614 in between the groups 620 of light sources is schematically and exemplarily shown in FIG. 11.

Figure 11:
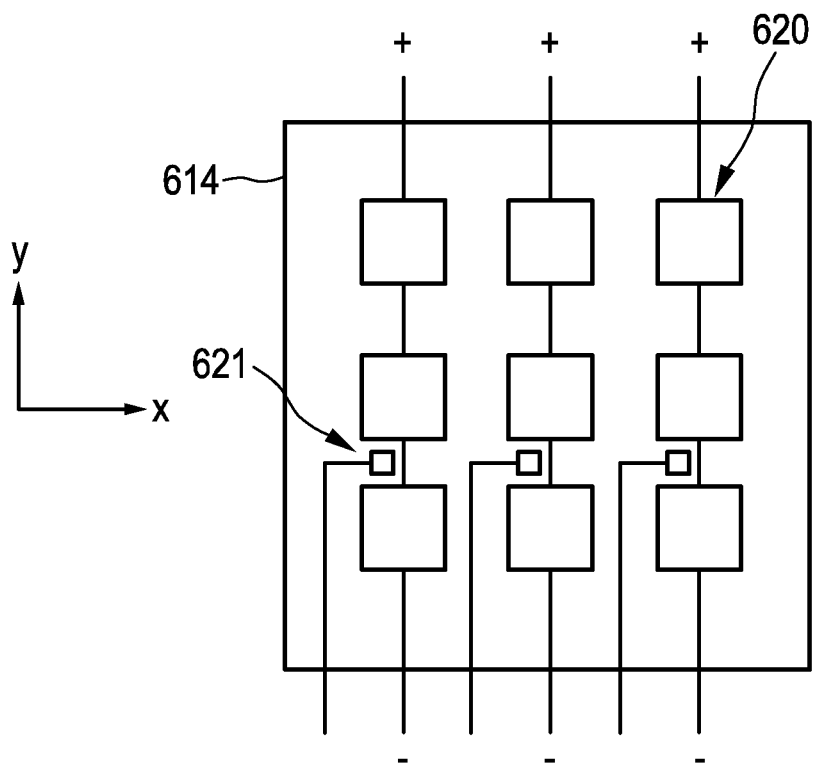
FIG. 11 shows schematically and exemplarily a further embodiment of groups of light sources with intermediate heat radiation detection units.

As can be seen in FIG. 11, in this embodiment the lighting apparatus comprises a 3×3 array of groups 620 of light sources, wherein three groups of light sources, which are arranged along a line being parallel to the y-axis, are electrically connected with the power source 8 such that each row of groups 620 of light sources, which is parallel to the y-axis, can be individually controlled independently from the other rows. The heat radiation detection units 621 are arranged along a line being parallel to the x-axis such that the heat radiation detection units 621 can be used to measure the temperature profile along a line being perpendicular to the sealing line. The control unit 12 can be adapted to control the power source 8 such that the three different rows of groups 620 of light sources are individually supplied with the powers depending on the temperature profile measured by the temperature radiation detection units 621 such that a desired predefined temperature profile is obtained. In particular, the control unit 12 can be adapted to control the power source 8 such that the generated temperature profile along a direction being perpendicular to the sealing line is as homogeneous as possible.

Figure 12:
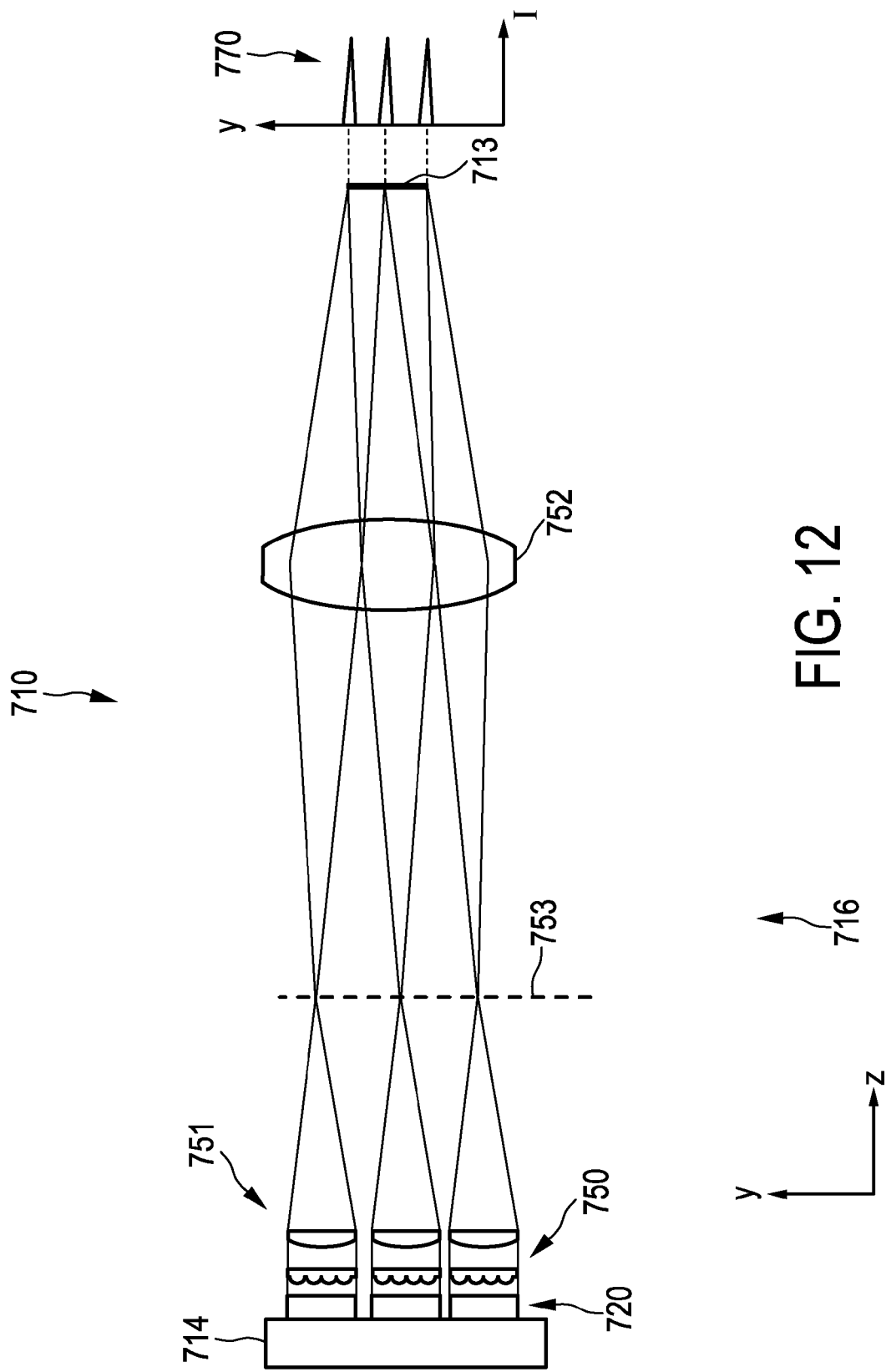
FIGS. 12 and 13 show schematically and exemplarily different side views of a further embodiment of the lighting apparatus of the processing apparatus.
Figure 13:
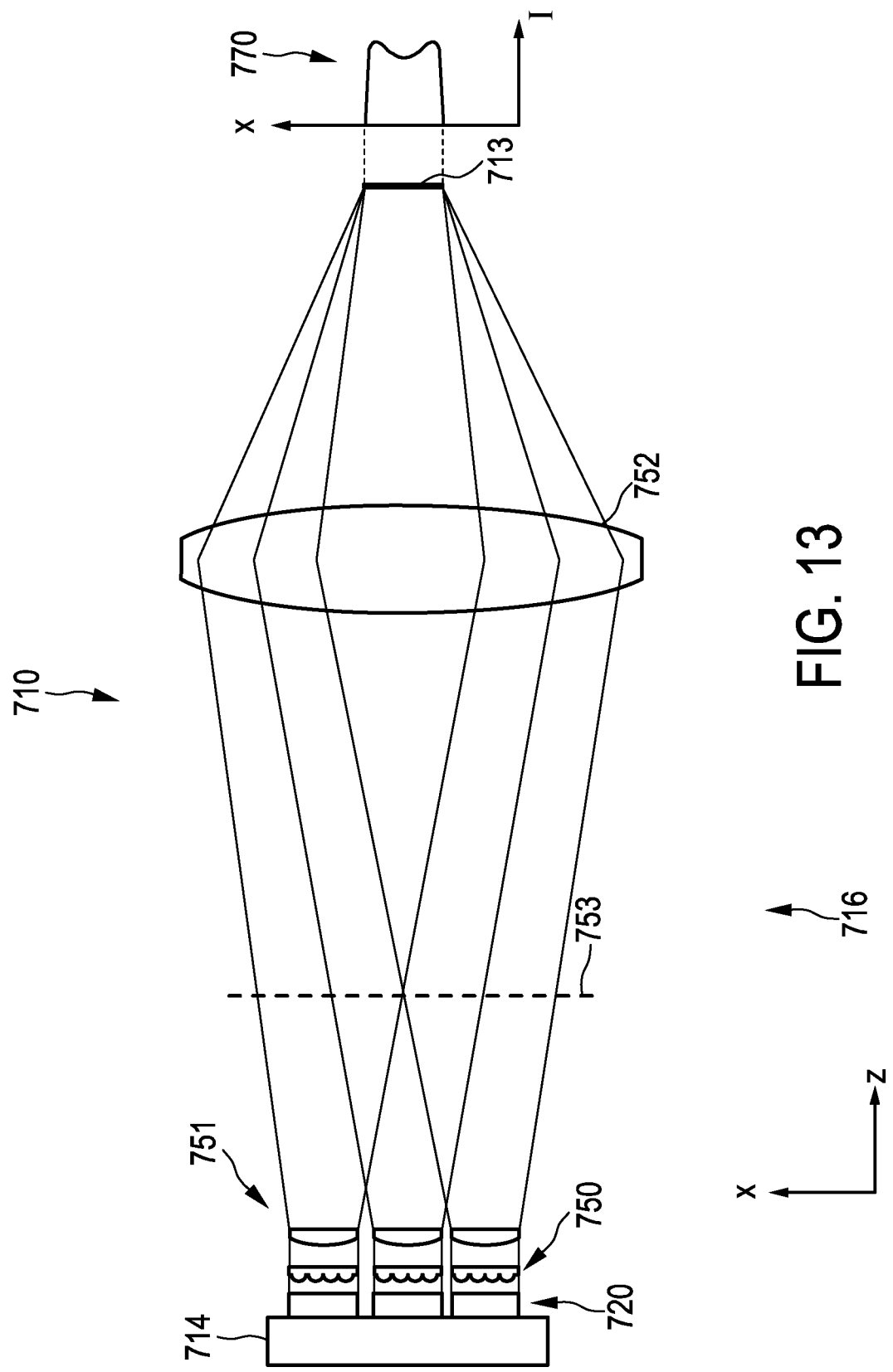

The lighting apparatus 610 further comprises an imaging unit 616 for imaging the groups 620 of light sources onto the working plane, in which the object is to be sealed, for generating the sealing light. The resulting intensity distribution in the working plane is indicated by reference number 13. The rays indicated in FIG. 10 and also in the further FIGS. 4, 12 and 13 are only shown for illustrative purposes and do not necessarily show the exact ray paths.

The imaging unit 616 being an optical element like a lens and the group 620 of light sources are arranged such that images of the different groups of the light sources overlap in the working plane. The groups 620 of light sources and the optical element 616 can therefore be configured such that the groups 620 of light sources are not sharply imaged in the working plane, but that slightly blurred images overlap in the working plane. For instance, the optical element 616 can be adapted to image a plane between the groups 620 of light sources and the optical element 616 sharply onto the working plane, wherein in the imaged plane between the groups 620 of light sources and the optical element 616 the light of the different groups 620 of light sources overlaps.

Heat radiation 623 from the working plane can traverse the optical element 616 and can be detected by the heat radiation detection units 621.

Thus, in between VCSEL chips the heat radiation detection units can be placed, wherein the light generated by the groups of light sources and the heat radiation can use the same imaging optics. The heat radiation detection units preferentially comprise photodiodes and filters in front of the photodiodes for allowing substantially only heat radiation to be sensed by the photodiodes. Instead of photodiodes also other light sensitive devices could be used.

The wavelength sensitivity of the heat radiation detection units is preferentially chosen to be much longer than the laser emission, in order to separate the heat radiation from the sealing element 5, in particular, from the frit-seal material, from the laser radiation. For example, the groups of light sources can emit at a wavelength of about 808 nm and the heat radiation detection units can be adapted to measure radiation having a wavelength being larger than 1500 nm.

The heat radiation detection units are preferentially associated to individual addressing lines of the groups of light sources, wherein a measurement of the temperature profile across the sealing line, i.e. perpendicular to the sealing line, and a feedback loop can be provided. The feedback loop preferentially comprises the heat radiation detection units for measuring the temperature profile, the control unit and the power source. The power source can comprise individual power supply groups, which are in communication with the control unit 12, in order to allow the control unit 12 to communicate with the individual power supply groups, wherein each power supply group can be connected to a respective row of three groups of light sources shown in FIG. 11. The control unit can be adapted to, for example, modify the current through the outer groups of light sources, in order to realize a flat temperature profile.

In the following a further embodiment of a lighting apparatus, which can be used instead of the lighting apparatus 10 described above with reference to FIGS. 1 to 9 by the sealing apparatus 1, will exemplarily and schematically be described with reference to FIGS. 12 to 15.

FIGS. 12 and 13 show different side views of the lighting apparatus 710. As can be seen in these figures, also in this embodiment the lighting apparatus 710 comprises groups 720 of light sources, which are arranged on a substrate 714. The light of each group 720 of light sources is imaged by an individual array of microlenses 750, an individual cylinder lens 751 and a common optical element 752 being preferentially a common optical lens. The arrays 750 of microlenses are adapted such that to each light source of a group of light sources a single microlens is assigned. The arrays 750 of microlenses, the cylinder lenses 751 and the common optical element 752 form an imaging unit 716 of the lighting apparatus 710.

The cylinder lenses are arranged such that in the side view shown in FIG. 12, which shows a plane in which the y-axis and the z-axis are located, the groups 720 of light sources are imaged into the plane 753 which is imaged into the working plane by the optical element 752, wherein the resulting intensity distribution 770 comprises relatively sharp peaks along the y-direction as schematically and exemplarily shown in the right part of FIG. 12. Moreover, the cylinder lenses 751 are preferentially arranged such that in the side view shown in FIG. 13, which shows a plane including the x-axis and the z-axis, the cylinder lenses 751 do not influence the light, wherein in the plane 753 the light of the different groups 720 of light sources overlaps in the x-direction. As can be seen in the right part of FIG. 13, along the x-direction the profile of the intensity distribution 770 is substantially M-shaped. In FIGS. 12 and 13, reference number 713 indicates the image of the plane 753.

The groups 720 of light sources and the imaging unit 716 are adapted such that the intensity distribution 770 producible by the lighting apparatus 710 comprises several parallel light lines, wherein within a respective light line the intensity distribution has a first maximum and a second maximum and wherein an intensity dip is located between the first maximum and the second maximum, in order to form the substantially M-shaped intensity distribution 770.

Figure 14:
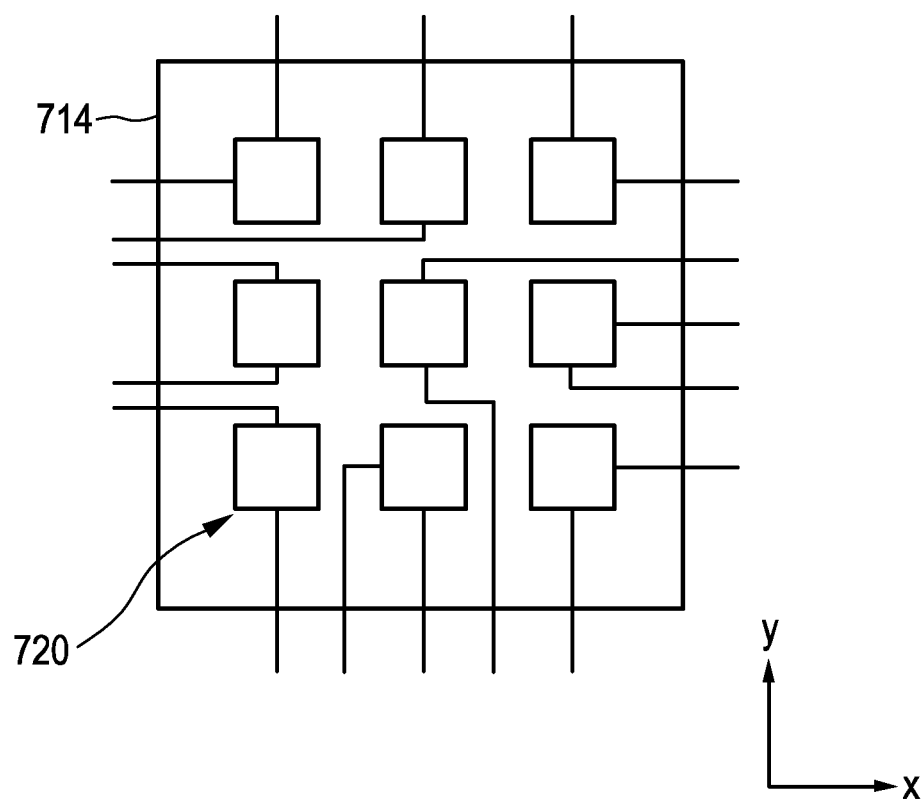
FIG. 14 shows schematically and exemplarily an arrangement of groups of light sources of the embodiment of the lighting apparatus shown in FIGS. 12 and 13.

FIG. 14 shows schematically and exemplarily a top view of the group of light sources 720 on the substrate 714. As can be seen in FIG. 14, in this embodiment each group 720 of light sources is individually connected to the power source 8 such that each group 720 of light sources is individually controllable, in order to modify the intensity distribution 770 as desired.

Figure 15:
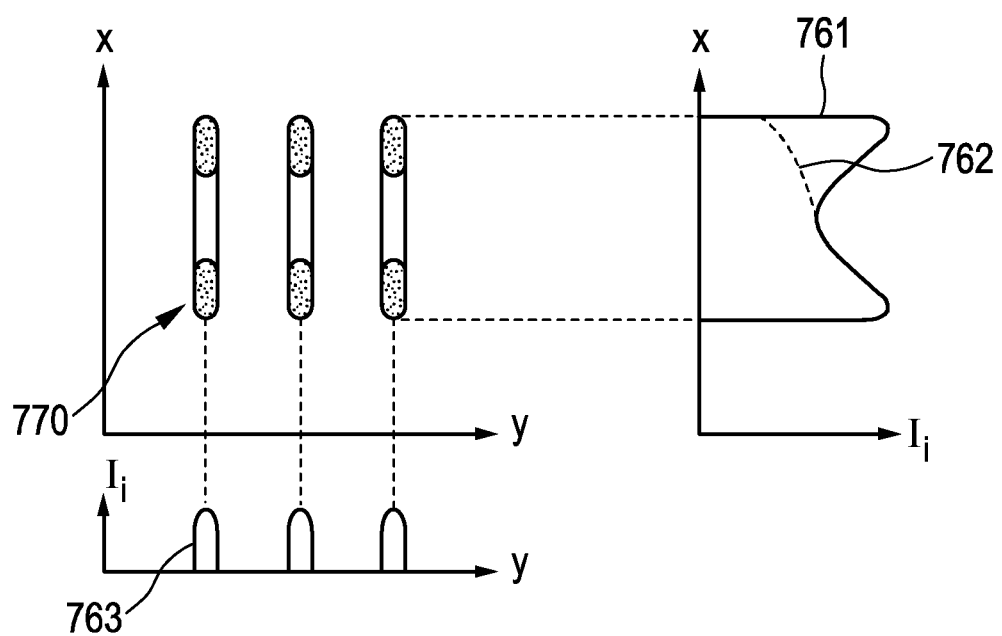
FIG. 15 illustrates intensity profiles and integrated intensity profiles of the processing light generated by the lighting apparatus shown in FIGS. 12 and 13.

FIG. 15 illustrates the integrated intensity distributions, which result from the intensity distribution 770 formed by the lighting apparatus 710 described above with reference to FIGS. 12 to 14. The integrated intensity distribution 763, which depends on the y-position and which has been determined by integrating the intensity distribution 770 along the x-direction, comprises three relatively sharp maxima 763, wherein there are gaps between these maxima 763. The integrated intensity distribution 761, which depends on the x-position and which is the intensity distribution 770 integrated along the y-direction, comprises two outer maxima with an intermediate intensity dip and is therefore substantially M-shaped. As indicated by the broken line 762, the integrated intensity distribution can be modified by reducing an outer maximum by controlling the groups 720 of light sources accordingly, in particular, if the sealing light is steered along a curved part of the sealing line.

Figure 16:
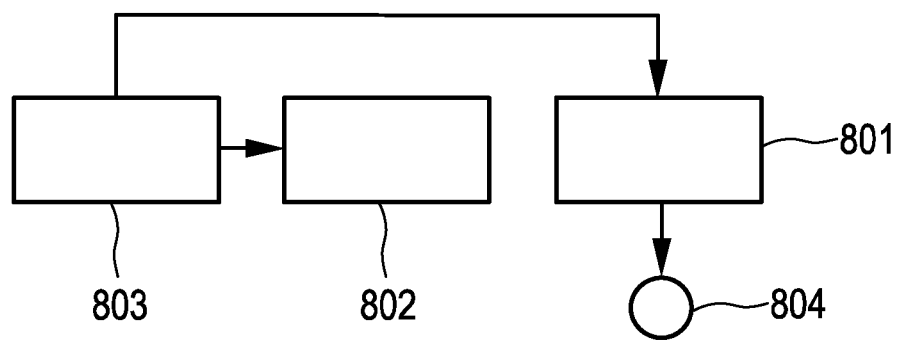
FIG. 16 shows a flowchart exemplarily illustrating an embodiment of a processing method for processing an object along a processing line.

In the following a processing method for processing an object along a processing line being, in this embodiment, a sealing method for sealing an object along a sealing line will exemplarily be described with reference to a flowchart shown in FIG. 16.

In step 801, sealing light is provided by the lighting apparatus such that it is directed onto a sealing element like a glass frit. Simultaneously with step 801, the lighting apparatus and the object and, thus, the sealing element are moved with respect to each other such that the sealing light is moved along the sealing line by a moving unit in step 802, wherein the sealing element is arranged along the sealing line. In this way the sealing light is steered along the sealing line for, for instance, melting the glass frit, in order to seal the object. During this sealing process the temperature profile along a spatial direction being perpendicular to the sealing line is measured in step 803 by using radiation detection elements, wherein the measure temperature profile can be provided to a control unit controlling the moving unit and/or a power source powering the lighting apparatus for controlling the movement of the sealing light along the sealing line and/or the light intensity distribution on the sealing line depending on the measured temperature profile. After the sealing element has been used to completely seal the object, the sealing method ends in step 804.

Figure 17:
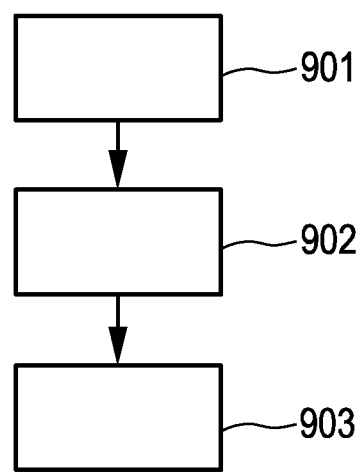
FIG. 17 shows a further flowchart exemplarily illustrating a manufacturing method for manufacturing a lighting apparatus for providing processing light for processing an object, and FIGS. 18 and 19 schematically and exemplarily show further embodiments of arrangements of groups of light sources of the lighting apparatus.

In the following an embodiment of a manufacturing method for manufacturing a lighting apparatus will exemplarily be described with reference to a flowchart shown in FIG. 17.

In step 901, a group of light sources for generating light for sealing the object is provided. In step 902, an imaging unit for imaging the groups of light sources onto a working plane, in which the object is to be sealed, for generating the sealing light is provided. In step 903, the groups of light sources and the imaging unit are assembled for producing the lighting apparatus. The groups of light sources and the imaging unit are configured and assembled such that in the working plane the sealing light is producible with an intensity distribution which is configured such that, if the intensity distribution is integrated in a spatial integration direction, the resulting integrated intensity distribution has an intensity dip, and that one or several of the groups of light sources are controllable independently from the other of the groups for modifying the intensity distribution.

The sealing apparatus can be adapted to hermetically seal displays, in particular, organic light emitting diode (OLED) displays, in production. For this purpose the sealing element can be an about 2 mm wide trace of glass frit close to the rim of the display, which is progressively molten by the sealing light provided by the lighting apparatus, wherein the whole contour is preferentially processed via a mechanical movement of the respective display and, thus, the sealing element and the sealing light with respect to each other. During the sealing process the temperature distribution across the sealing element can be critical, in particular, close to rounded display edges, because a lower progression speed inside the curve can lead to overheating and burning. Also if reflective addressing lines underneath the sealing element are crossed, which can happen a few thousand times, the reflection can lead to an overheating of the sealing element. The sealing apparatus described above provides therefore preferentially a tailored, addressable and controllable intensity distribution.

In particular, the sealing apparatus preferentially provides a high power VCSEL solution based on an addressable module which can be moved along the sealing line. The intensity distribution can be tailored using the optical properties of the VCSELs, wherein different VCSEL patterns can be superimposed, in order to address different needs along the sealing track, i.e. along the sealing line. The VCSELs can be arranged such that requirements on the number of electrical connections and on different VCSEL chips can be minimized. Moreover, the sealing apparatus can be adapted to control the intensity distribution based on integrated pyrometry, especially as described above with reference to FIGS. 10 and 11.

The groups of light sources of the lighting apparatus are preferentially arranged on one or several substrates such that the one or several substrates comprise light emitting areas and non-light emitting areas. The non-light emitting areas can be adapted to absorb and/or scatter light meeting the non-light emitting areas such that light back-reflected from the working plane is not reflected back to the working plane.

In particular, as parts of the target area, to which the sealing light is directed, may be reflective, a significant part of the irradiated power can generally be reflected back from the target. However, the sealing apparatus, in particular, the lighting apparatus, can be adapted to reduce the amount of light going back to unwanted places on, for example, the display to be sealed. Thus, the lighting apparatus of the sealing apparatus can be designed in a way that back reflections from, for instance, a display to be sealed do not cause "ghost images". For instance, the non-light emitting areas may be black, tilted with respect to the light emitting areas or adapted to scatter the light in arbitrary directions, i.e., for example, a part of a VCSEL chip outside a light emitting area can be black, scattering or tilted by a certain angle. Also the laser module, i.e. the lighting apparatus, may be tilted with respect to the working plane such that light directly reflected by the working plane is not directed back into the laser module.

Although in the above described embodiments the light sources, in particular, the VCSELs, have certain shapes, in other embodiments the light sources can also have other shapes, for instance, all or some of the light sources can have a bowtie shape. Moreover, for example, instead of the certain shapes shown in FIG. 8, the light sources shown in this figure can be replaced by rectangular light sources and triangular light sources, wherein regarding the triangular light sources the centers of the microlenses coincide with the ends of the triangular light sources and wherein regarding the rectangular light sources the centers of the microlenses coincide with the centers of the rectangular light sources. Moreover, in FIG. 8 instead of the roughly conically shaped light sources other light sources could be used, which are differently shaped, wherein these differently shaped lights sources have a first end with a larger width in the y-direction and an opposing second end with a smaller width in the y-direction.

Although in the above described embodiments the imaging units have certain optical configurations for imaging the light sources into the working plane, the imaging unit can also have other optical configurations. For instance, the imaging unit shown in FIG. 10 can additionally comprise microlenses, wherein each microlens is assigned to a respective light source and wherein the optical element 616, in particular, the lens 616, can be arranged to image the plane of the collimating microlenses instead of the near field. Generally, the focusing can be a bit out of focus, in order to avoid visible gaps between individual light sources or between individual groups of light sources in the working plane.

The sealing apparatus can be adapted such that in addition to individually addressable groups of light sources across a sealing line, also different segments along the sealing line are used. This may allow for a control of the temperature curve of the heating process along the sealing and allows for an additional freedom, in order to lower the amount of energy deposited at any individual location of the sealing material, i.e. in order to take into account potential overheating caused by, for instance, underlying reflective addressing lines like underlying aluminum addressing lines. In case of low thermal conductivity materials like glass or plastic materials the temperature increase is generally determined by the accumulated deposited energy, wherein the freedom provided by the different individually controllable segments along the sealing line can be used to structure the temperature along the sealing line direction. Gaps can be present between the groups of light sources, i.e., for instance, between the VCSEL chips, along the sealing line, in order to facilitate electrical contacting or in order to allow to arrange sensor elements like the above mentioned heat radiation detection units between the groups of light sources. The electrical addressing of all groups can be individual, in order to provide a maximal degree of freedom. However, it is also possible that several groups are combined, in order to facilitate electrical contacting.

Figure 18:
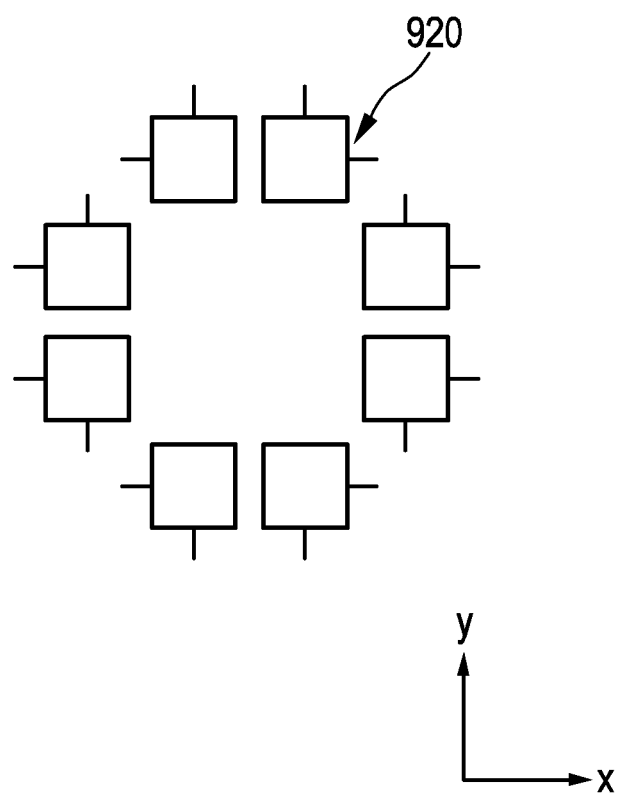
Figure 19:
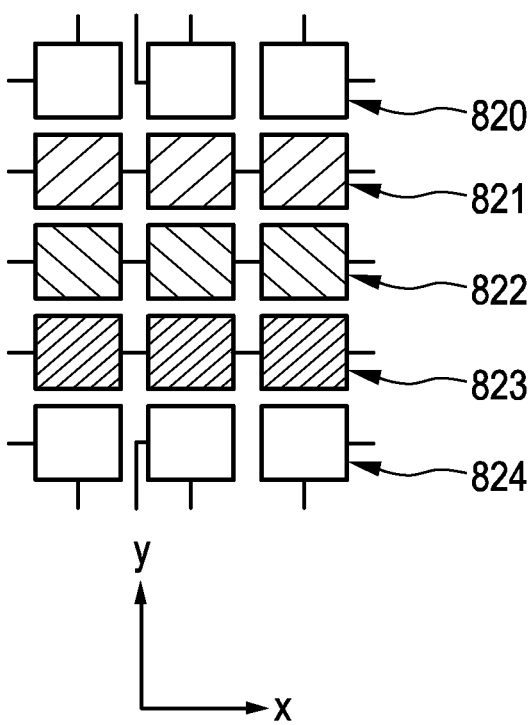

Although in the above described embodiments the groups of light sources are arranged in certain configurations and are electrically connected in certain ways, in other embodiments the groups of light sources can also be arranged in other configurations and the electrical connections to the power source can also be different. For instance, as schematically and exemplarily shown in FIG. 18, several groups 920 of light sources can be symmetrically arranged, in particular, substantially along a circle or along a square, wherein each group 920 of light sources can be individually addressable. This may allow for a movement of the sealing line around a curve without turning the laser head, i.e. without turning the lighting apparatus. FIG. 19 shows schematically and exemplarily a further possible arrangement of groups of light sources. In this example the arrangement comprises several sets 820 ... 824 of groups of light sources, wherein within a respective set the groups of light sources are arranged along a line being parallel to the x-direction and wherein the different lines of the different sets are parallel to each other. The groups of light sources of the first set 824 and of the last set 820 with respect to the y-direction are electrically connected to the power source such that they are individually controllable, whereas the groups of light sources of the other sets 821, 822, 823 are electrically connected such that the groups of light sources of a same set are commonly controllable and different sets are individually controllable. Thus, in this example an individual addressing with respect to groups is only realized for the first and last sets 824, 820. Such a configuration and electrical connection allows accessibility of all individual parts from an edge by, for example, wire bonding.

For individually controlling one or several groups of the groups of light sources the power source can comprise individual power supply units, which are electrically connected with the respective groups of light sources, which are individually controlled.

Although in the above described embodiments the processing apparatus is a sealing apparatus for sealing, for instance, an OLED display by using a sealing element like a glass frit, the processing apparatus can also be a sealing apparatus performing another sealing operation, which requires sealing light. For instance, a sealing apparatus can be provided being adapted to directly seal an object, without requiring a sealing element. Moreover, a sealing apparatus can be provided being adapted to seal other objects. In general, a sealing apparatus can be provided being adapted to be used for many sealing applications where a specific intensity profile is applied and progressed along, for instance, a rim of an object to be sealed. For example, the sealing apparatus can be adapted to seal OLED lighting systems, photovoltaic cells, plastic packaging for food, drugs, et cetera.

The processing apparatus can also be adapted to perform another procedure not being a sealing procedure. For instance, the processing apparatus can be adapted for performing soldering or welding procedures in which a material is molten by light provided by the lighting apparatus.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the sealing apparatus in accordance with the sealing method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a lighting apparatus for providing processing light for processing an object. Groups of light sources generate light for processing the object, wherein the groups of light sources are imaged onto a working plane by an imaging unit for producing the processing light. The resulting intensity distribution is configured such that, if the intensity distribution is integrated in a spatial integration direction, the resulting integrated intensity distribution has an intensity dip, wherein one or several of the groups of light sources are controllable independently from the other of the groups of light sources for modifying the integrated intensity distribution. This allows using the lighting apparatus in a processing apparatus such that perpendicular to a processing line, along which an object is to be processed, in particular, to be sealed, the object can be processed relatively homogenously, thereby improving the quality of processing the object.

The invention claimed is:

1. A lighting apparatus for providing processing light for sealing an object comprising a sealing element for sealing the object along a sealing line, the lighting apparatus comprising:
   groups of light sources for generating light for processing the object,
   an imaging unit for imaging the groups of light sources onto a working plane in which the object is to be sealed, thereby generating the processing light,
   wherein the groups of light sources and the imaging unit are adapted such that in the working plane the processing light is producible with an intensity distribution which is configured such that, if the intensity distribution is integrated in a spatial integration direction, the resulting integrated intensity distribution has an intensity dip, wherein one or several of the groups of light sources are controllable independently from the other of the groups of light sources for modifying the integrated intensity distribution,
   wherein the groups of light sources and the imaging unit are adapted such that the integrated intensity distribution has a first maximum caused by light provided by a group of the groups of light sources and a second maximum caused by light provided by another group of the groups of light sources, wherein the intensity dip is located between the first maximum and the second maximum,
   wherein at least one of the group causing the first maximum and the other group forming the second maximum is individually controllable such that the integrated intensity at the position of at least one of the first maximum and the second maximum, respectively, is reducible such that the sealing element can be homogeneously illuminated if the sealing element is arranged along a curved sealing line.

2. The lighting apparatus as defined in claim 1, wherein at least one of the groups of light sources is individually controllable such that the depth of the intensity dip is modifiable.

3. The lighting apparatus as defined in claim 1, wherein the groups of light sources and the imaging unit are adapted such that the intensity distribution producible by the lighting apparatus comprises several parallel light lines, wherein within at least one of the light lines the intensity distribution has a first maximum and a second maximum with an intermediate lower intensity.

4. The lighting apparatus as defined in claim 1, wherein the light sources of at least two groups have different shapes.

5. The lighting apparatus as defined in claim 1, wherein the imaging unit comprises microlenses assigned to the light sources such that for imaging a respective light source a respective microlens is used, wherein for at least one light source the microlens is asymmetrically arranged with respect to the light source such that a center of the microlens does not coincide with a center of the light source.

6. The lighting apparatus as defined in claim 1, wherein the imaging unit is adapted to image the groups of light sources onto the working plane such that images of the different groups of the light sources overlap in the working plane.

7. The lighting apparatus as defined in claim 1, wherein the lighting apparatus further comprises at least one heat radiation detection unit arranged adjacent to a group of light sources for measuring the temperature in the working plane such that the group of light sources is controllable depending on the measured temperature by a control unit.

8. The lighting apparatus as defined in claim 1, wherein and one or several of the groups of light sources are controllable independently from the other of the groups such that the intensity distribution is modifiable in two different spatial directions.

9. The lighting apparatus as defined in claim 1, wherein the groups of light sources are arranged on one or several substrates such that the one or several substrates comprise light emitting areas and non-light emitting areas, wherein the non-light emitting areas are adapted to absorb and/or scatter light meeting the non-light emitting areas such that light back reflected from the working plane is not reflected back to the working plane.

10. A processing apparatus for sealing an object comprising a sealing element for sealing the object along a sealing line, the processing apparatus comprising:
the lighting apparatus for providing processing light as defined in claim 1,
a moving unit for moving the lighting apparatus and the object with respect to each other such that the processing light is moved along the processing line.

11. A processing method for sealing an object comprising a sealing element for sealing the object along a processing line, the processing method comprising:
providing a processing light,
moving the light apparatus and the object with respect to each other such that the processing light is moved along the processing line by a moving unit
wherein the processing light is provided by controlling the groups of light sources and the imaging unit such that the integrated intensity distribution has a first maximum caused by light provided by a group of the groups of light sources and a second maximum caused by light provided by another group of the groups of light sources, wherein the intensity dip is located between the first maximum and the second maximum, and wherein at least one of the group causing the first maximum and the other group forming the second maximum is individually controllable such that the integrated intensity at the position of at least one of the first maximum and the second maximum, respectively, is reducible, such that the sealing element can be homogeneously illuminated if the sealing element is arranged along a curved sealing line.

* * * * *